US010933720B2

(12) United States Patent
Buckman et al.

(10) Patent No.: US 10,933,720 B2
(45) Date of Patent: Mar. 2, 2021

(54) HVAC AIR INLET HOUSING WITH WATER EVACUATION PATH

(71) Applicant: Valeo Climate Control Corp., Auburn Hills, MI (US)

(72) Inventors: Earl Buckman, Warren, MI (US); Darshan Parikh, Farmington Hills, MI (US); Richard Sikorski, Macomb, MI (US); Gregory McClane, Macomb Township, MI (US)

(73) Assignee: VALEO CLIMATE CONTROL CORP., Auburn Hills, MI (US)

( * ) Notice: Subject to any disclaimer, the term of this patent is extended or adjusted under 35 U.S.C. 154(b) by 144 days.

(21) Appl. No.: 16/230,975

(22) Filed: Dec. 21, 2018

(65) Prior Publication Data

US 2019/0308492 A1    Oct. 10, 2019

Related U.S. Application Data

(60) Provisional application No. 62/653,594, filed on Apr. 6, 2018.

(51) Int. Cl.
*B60H 1/32*    (2006.01)
*B60H 1/00*    (2006.01)

(52) U.S. Cl.
CPC ....... *B60H 1/3233* (2013.01); *B60H 1/00321* (2013.01); *B60H 1/00835* (2013.01); *B60H 1/3227* (2013.01); *B60H 2001/3286* (2013.01)

(58) Field of Classification Search
CPC .............. B60H 1/3233; B60H 1/32331; B60H 1/00664; F25D 2321/145; F24F 13/222
See application file for complete search history.

(56) References Cited

U.S. PATENT DOCUMENTS

| | | | | |
|---|---|---|---|---|
| 5,271,241 A * | 12/1993 | Kim | ................ | F25D 21/14 |
| | | | | 62/277 |
| 6,422,301 B1 * | 7/2002 | Scoccia | ................ | B60H 1/3233 |
| | | | | 165/42 |
| 6,604,992 B1 | 8/2003 | McNutt | | |
| 7,392,663 B2 * | 7/2008 | Kang | ................ | B60H 1/3233 |
| | | | | 454/121 |
| 8,997,837 B2 * | 4/2015 | Kakizaki | ................ | B60H 1/3233 |
| | | | | 165/42 |
| 9,636,975 B2 * | 5/2017 | Mazzocco | ............ | B60H 1/3233 |
| 10,569,621 B2 * | 2/2020 | Santilli | ................ | B60H 1/3233 |
| 2010/0212347 A1 * | 8/2010 | Kim | ................ | B60H 1/3233 |
| | | | | 62/285 |
| 2019/0232760 A1 * | 8/2019 | Cochran | ............ | B60H 1/00564 |

* cited by examiner

*Primary Examiner* — Christopher R Zerphey
(74) *Attorney, Agent, or Firm* — Dierker & Kavanaugh, P.C.

(57) ABSTRACT

An HVAC air inlet housing for a vehicle includes an air inlet housing having a top portion and a bottom portion. A fresh air duct, to convey fresh air from an air inlet to a blower, is defined by the air inlet housing. A water inlet port, to connect to an evaporator drain port via a hose, is defined in the bottom portion. The hose is to convey water from the evaporator drain port to the water inlet port. A water tunnel is defined by the air inlet housing to convey water from the water inlet port to a sluice defined in the bottom portion. The sluice is to convey water from the water tunnel to a sump defined in the bottom portion. A sump drain port is defined in the air inlet housing bottom portion in fluid communication with the sump to drain water from the sump.

20 Claims, 8 Drawing Sheets

Injection Molding a Top Portion and a Bottom Portion of an Air Inlet Housing, the Top Portion Separable from the Bottom Portion After the Injection Molding, wherein: a Fresh Air Duct is Defined by the Air Inlet Housing, the Fresh Air Duct to Convey Fresh Air from an Air Inlet to a Blower; a Water Inlet Port is Defined in the Bottom Portion, the Water Inlet Port to Connect to an Evaporator Drain Port via a Hose, the Hose to Convey Water from the Evaporator Drain Port to the Water Inlet Port; a Water Tunnel is Defined by the Air Inlet Housing to Convey the Water from the Water Inlet Port to a Sluice Defined in the Bottom Portion; the Sluice is to Convey the Water from the Water Tunnel to a Sump Defined in the Bottom Portion; and a Sump Drain Port is Defined in the Air Inlet Housing Bottom Portion in Fluid Communication with the Sump to Drain the Water from the Sump

*Fig-14*

HVAC AIR INLET HOUSING WITH WATER EVACUATION PATH

CROSS-REFERENCE TO RELATED APPLICATIONS

This application claims the benefit of U.S. Provisional Application Ser. No. 62/653,594, filed Apr. 6, 2018, the entire contents of which is incorporated by reference herein.

BACKGROUND

HVAC (Heating Ventilation and Air Conditioning) systems are used for climate control of, e.g., internal cabin areas of an automobile. HVAC systems may be configured with an HVAC module having a heat exchanger disposed in a housing. An HVAC distribution system may be operatively connected to the HVAC module. An HVAC system may have one or more airflow paths for allowing air to flow, for example, to, from, and/or within the HVAC module and the HVAC distribution system. An HVAC air inlet housing may be connected to a blower of the HVAC module. The blower may draw air through the air inlet housing and blow the air into an evaporator housing. An evaporator in the evaporator housing is a heat exchanger that cools and dehumidifies the air. Because the evaporator is cooler than the air, water may tend to condense on the evaporator. The condensation water may be directed outside of the passenger compartment.

SUMMARY

An HVAC air inlet housing for a vehicle includes an air inlet housing having a top portion and a bottom portion. A fresh air duct, to convey fresh air from an air inlet to a blower, is defined by the air inlet housing. A water inlet port, to connect to an evaporator drain port via a hose, is defined in the bottom portion. The hose is to convey water from the evaporator drain port to the water inlet port. A water tunnel is defined by the air inlet housing to convey water from the water inlet port to a sluice defined in the bottom portion. The sluice is to convey water from the water tunnel to a sump defined in the bottom portion. A sump drain port is defined in the air inlet housing bottom portion in fluid communication with the sump to drain water from the sump.

BRIEF DESCRIPTION OF THE DRAWINGS

Features of examples of the present disclosure will become apparent by reference to the following detailed description and drawings, in which like reference numerals correspond to the same or similar, though perhaps not identical, components. For the sake of brevity, reference numerals or features having a previously described function may or may not be described in connection with other drawings in which they appear.

DETAILED DESCRIPTION

Space in the passenger compartment of an automobile may be used, among other purposes, for devices to control of the vehicle; and for passenger entertainment and comfort-promoting devices. Water dissolved in the air (humidity) condenses on a cold evaporator of an HVAC system. The water accumulates in the bottom of the evaporator housing. In some vehicles, it is desirable to allow the water to drain outside of the passenger compartment of the vehicle onto the road, where the water evaporates. In examples of the present disclosure, a water tunnel is integrated into two molded portions of an air intake housing. Examples of the present disclosure provide a drain path (via the water tunnel) for water through or adjacent to the fresh air inlet while keeping the water separate from the fresh air. As such, the fresh air does not absorb additional humidity before reaching the blower intake. Further, keeping the fresh air duct dry may reduce undesirable odors from microorganisms that may grow in dark, moist environments.

Figure 1:
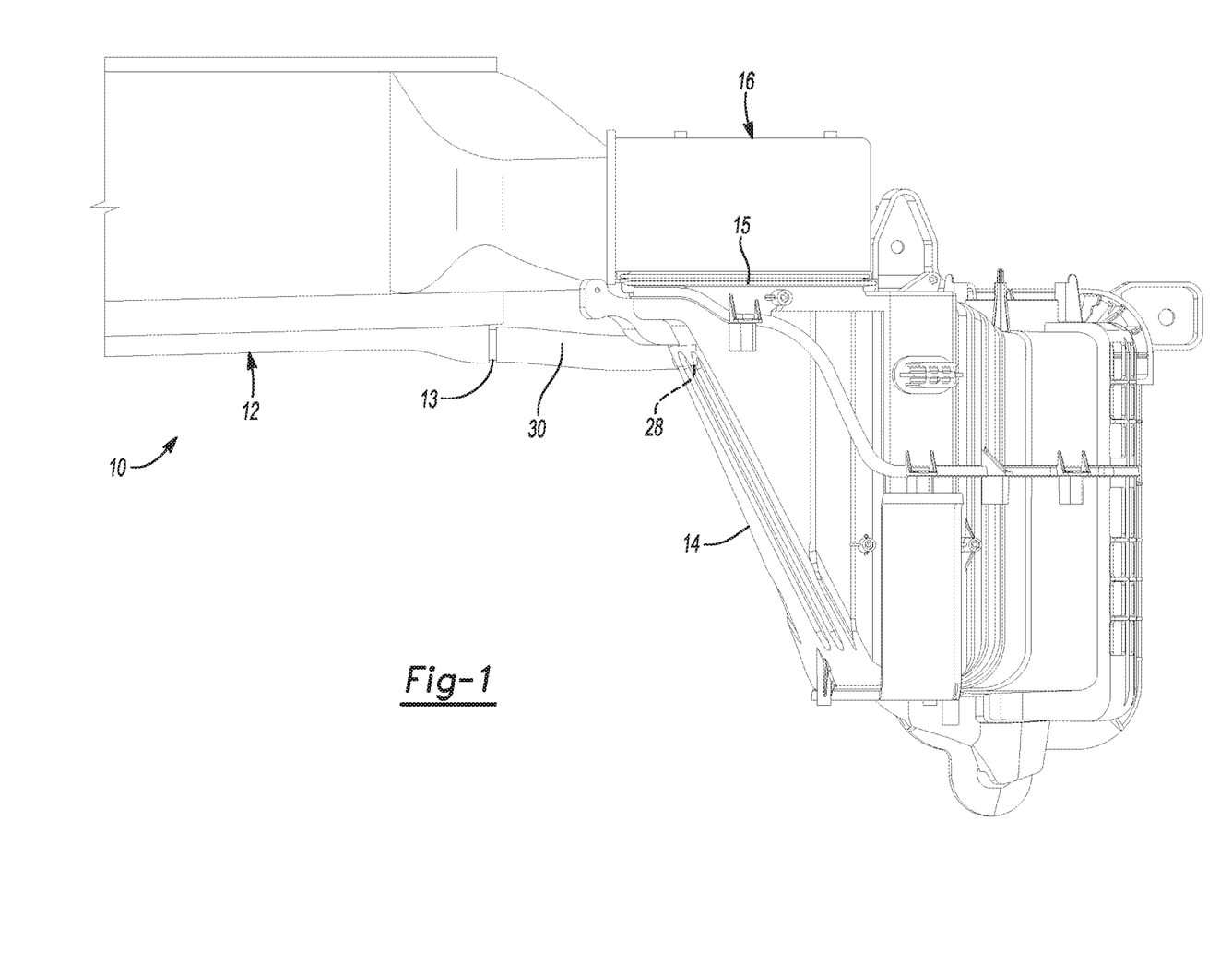
FIG. 1 is a rear view of an example of a portion of an HVAC system according to the present disclosure.
Figure 2:
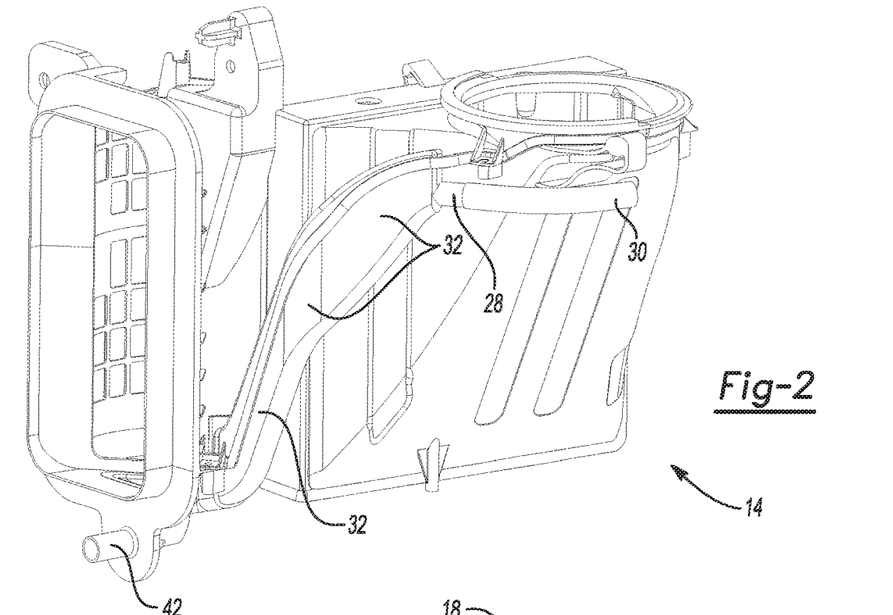
FIG. 2 is a right perspective view of an example of an air inlet housing from FIG. 1 according to the present disclosure.
Figure 3:
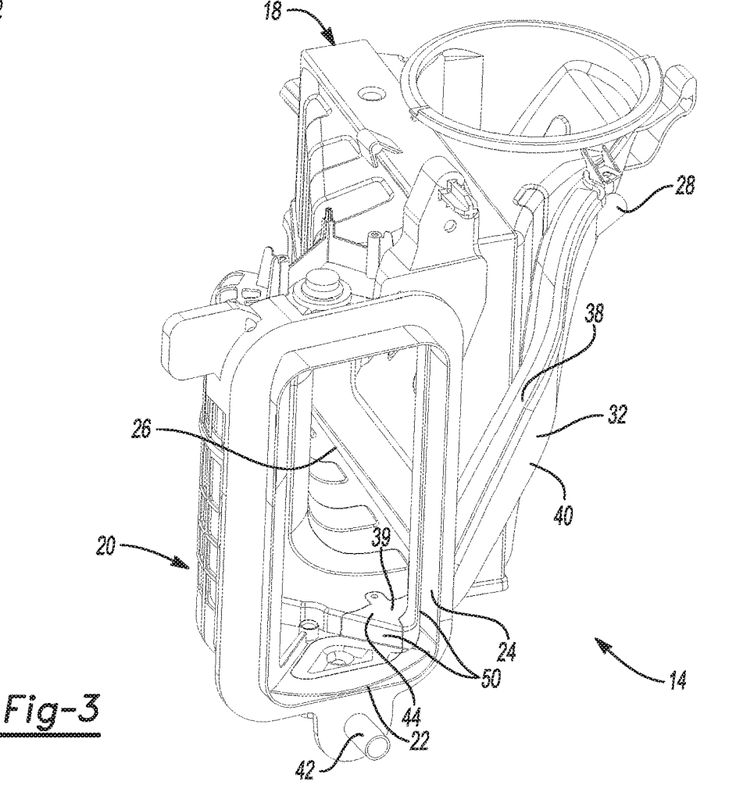
FIG. 3 is a front perspective view of the example of the air inlet housing depicted in FIG. 2 according to the present disclosure.
Figures 4, 5:
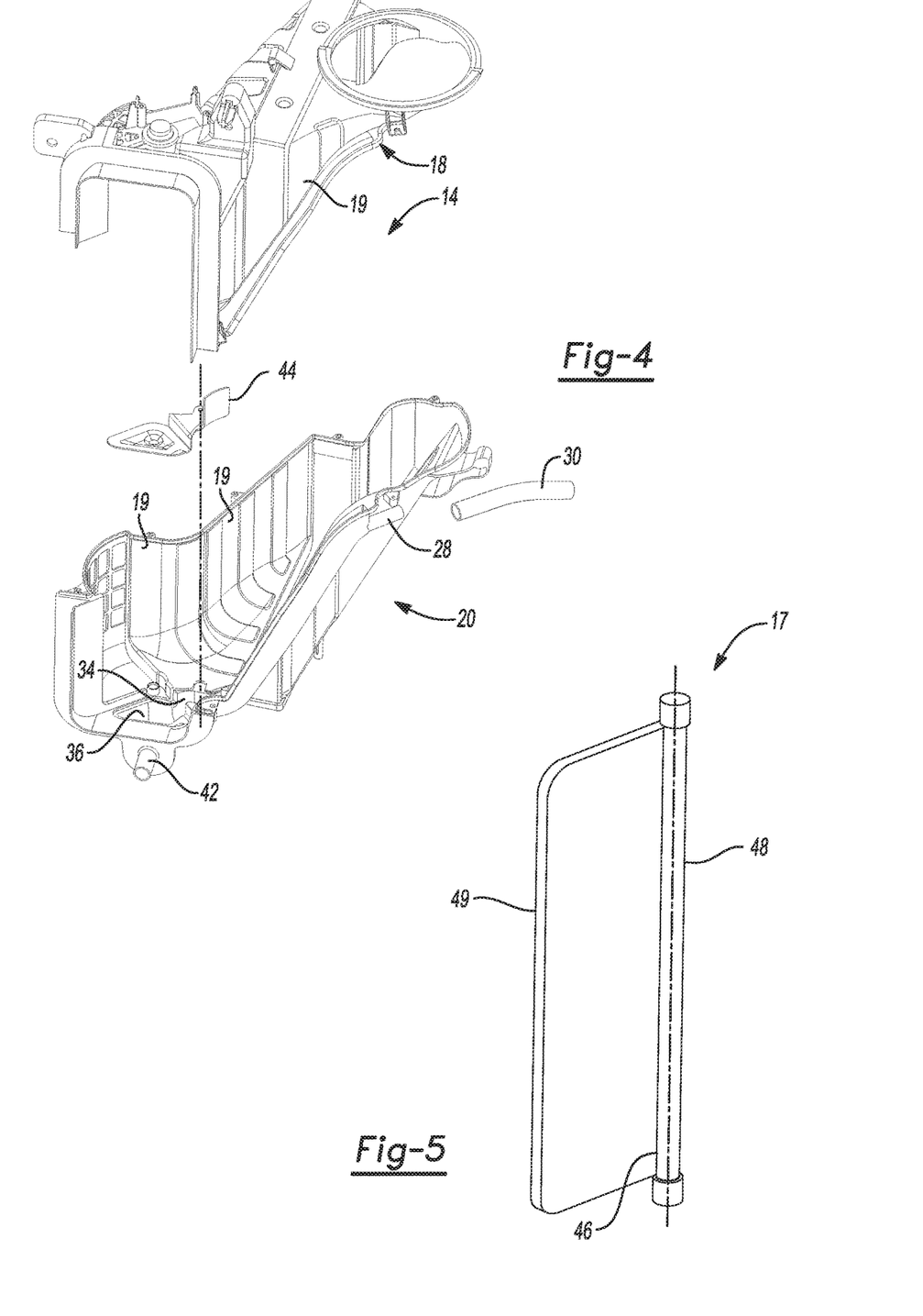
FIG. 4 is an exploded perspective view of the example of the air inlet housing depicted in FIG. 2 according to the present disclosure.
FIG. 5 is a perspective view of an example of a baffle door according to the present disclosure.
Figure 6:
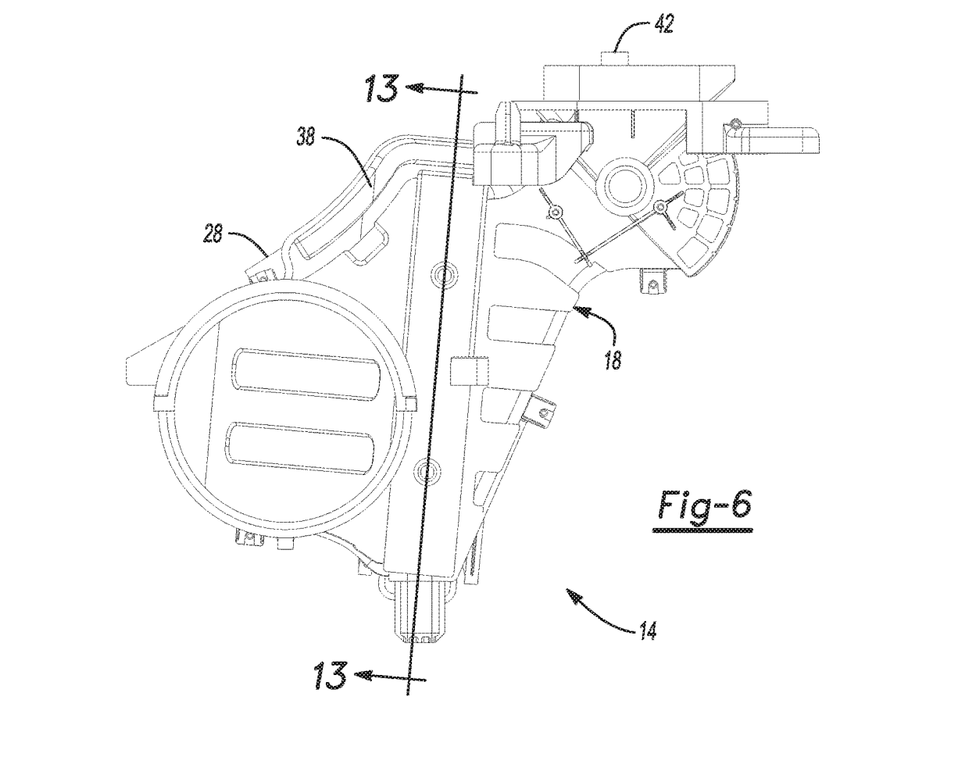
FIG. 6 is a top view of the example of the air inlet housing depicted in FIG. 2 according to the present disclosure.
Figure 7:
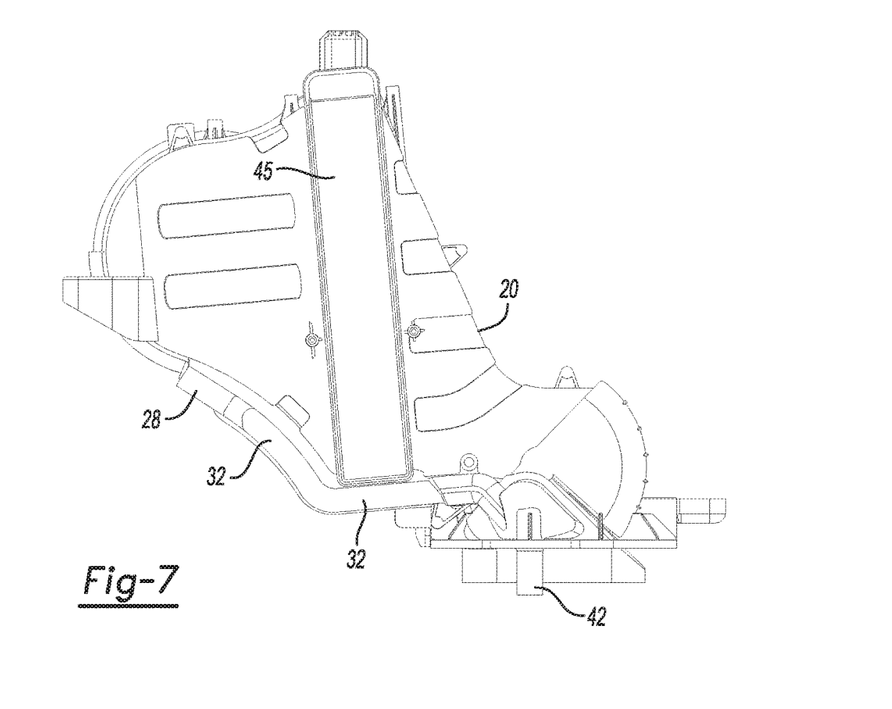
FIG. 7 is a bottom view of an example of the air inlet housing depicted in FIG. 2 according to the present disclosure.
Figure 8:
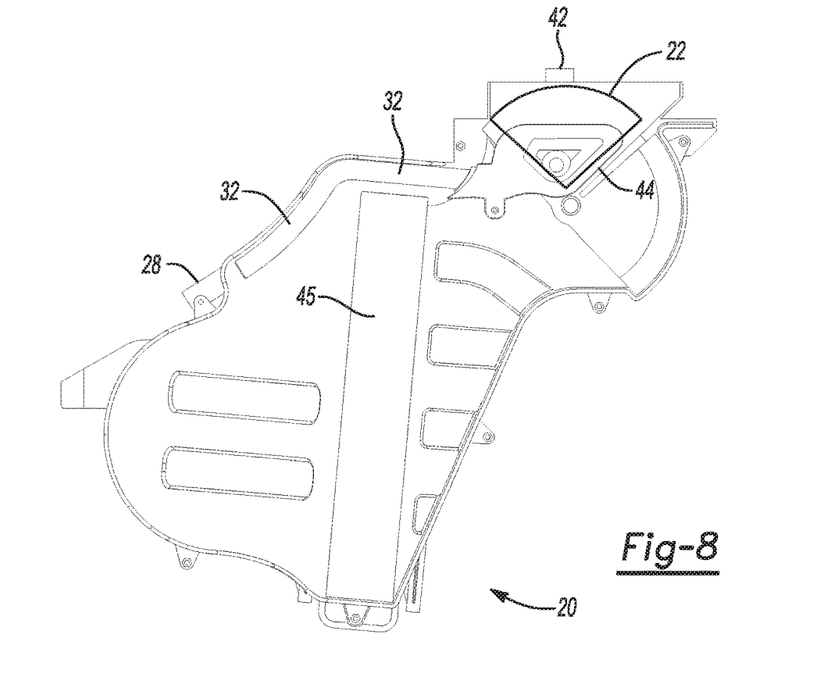
FIG. 8 is a top view of the example of the air inlet housing bottom portion from the air inlet housing depicted in FIG. 2 according to the present disclosure.
Figure 9:
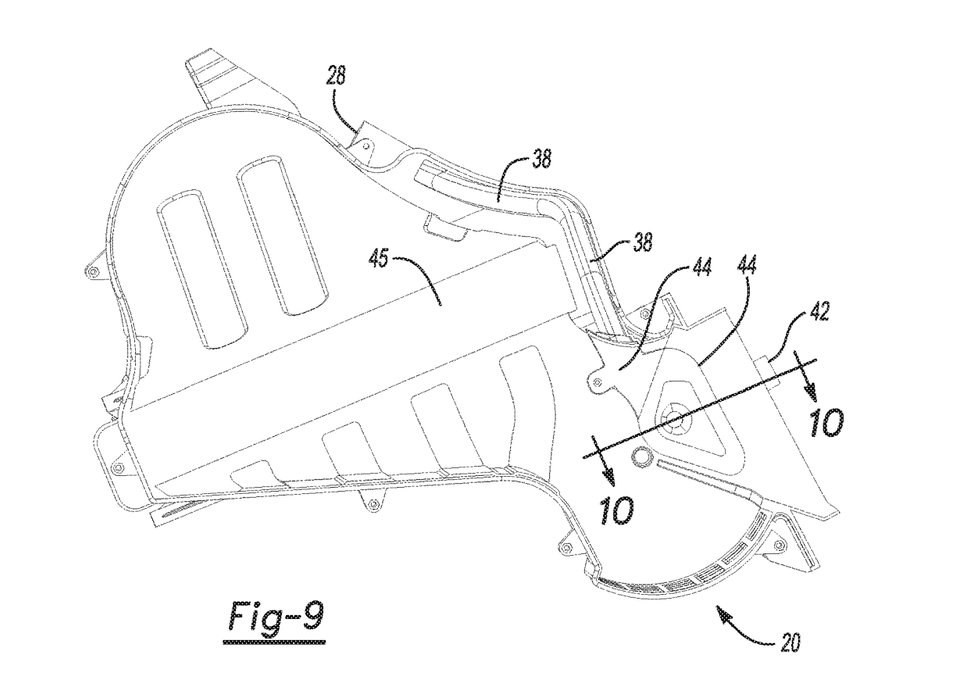
FIG. 9 is a perspective view of the example of the air inlet housing bottom portion depicted in FIG. 8 according to the present disclosure.
Figure 10:
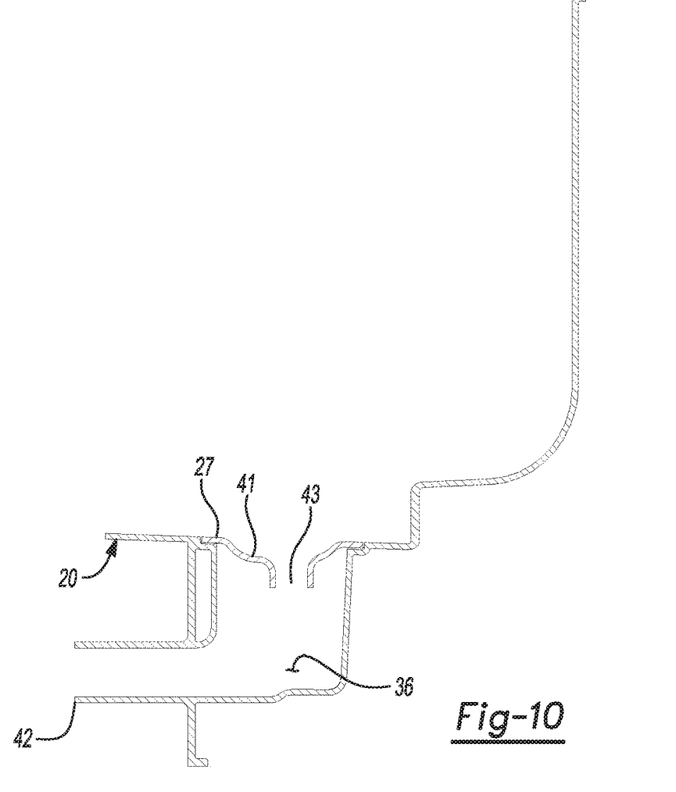
FIG. 10 is a portion of a cross-sectional view taken through the cap and sump as depicted in FIG. 9.
Figure 11:
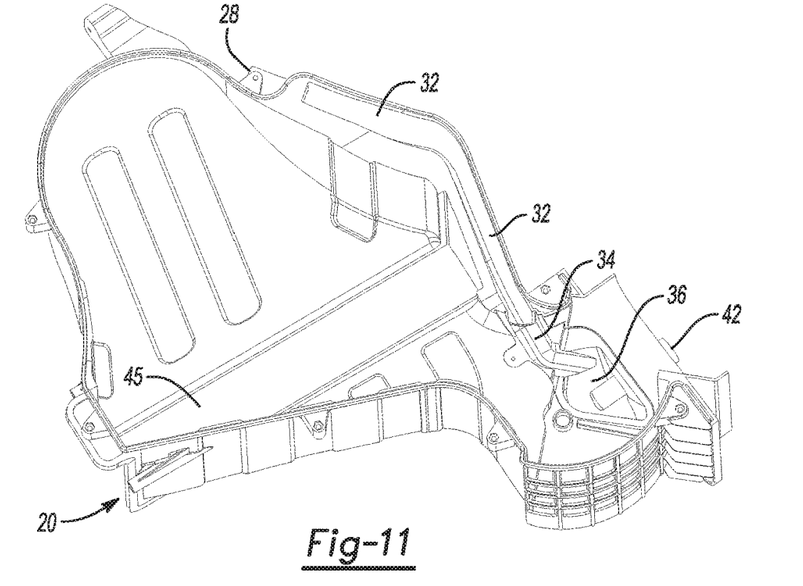
FIG. 11 is a perspective view of the example of the air inlet housing bottom portion depicted in FIG. 9 with the cap removed according to the present disclosure.
Figure 12:
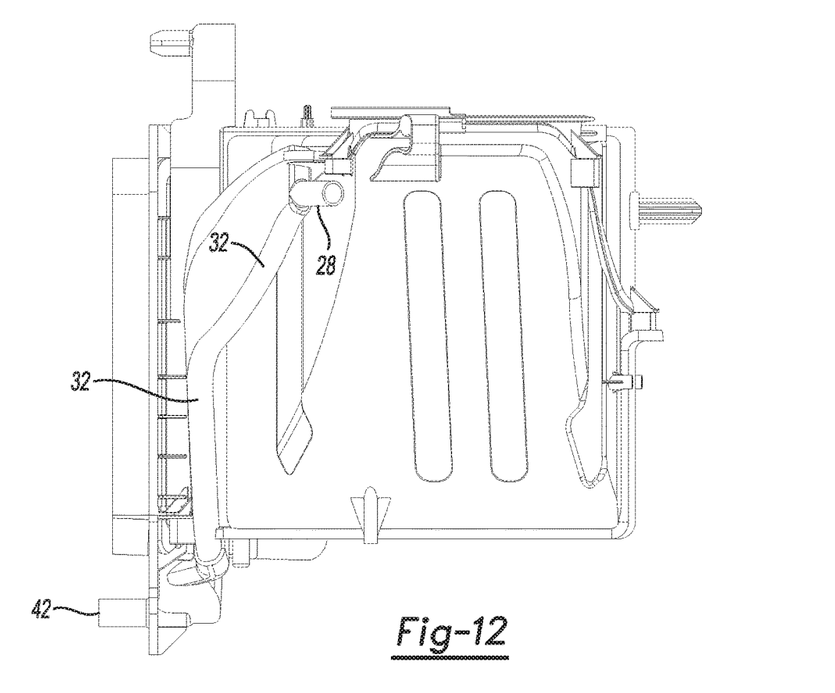
FIG. 12 is a right side view of the example of the air inlet housing depicted in FIG. 2 according to the present disclosure.

FIG. 1 depicts an external view of an example of a portion of an HVAC system 10 including an air inlet housing 14 as disclosed herein. FIGS. 2 and 3 depict external views of the example of the air inlet housing 14 depicted in FIG. 1. FIG. 4 is an exploded perspective view of the example of the air inlet housing 14 depicted in FIG. 3 according to the present disclosure. In examples of the present disclosure, an HVAC air inlet housing 14 for a vehicle includes a top portion 18 and a bottom portion 20. The HVAC air inlet housing 14 includes a fresh air duct 26 defined by the air inlet housing 14. (See FIG. 3) The fresh air duct 26 is to convey fresh air from an air inlet 24 to a blower 16. (See blower 16 in FIG. 1.) A water inlet port 28 is defined in the bottom portion 20. The water inlet port 28 is to connect to an evaporator drain port 13 via a hose 30. (See FIG. 1.) The hose 30 is to convey water from the evaporator drain port 13 to the water inlet port 28. The HVAC air inlet housing 14 includes a water tunnel 40 defined by the air inlet housing 14 to convey the water from the water inlet port 28 to a sluice 34 defined in the bottom portion 20. (See FIG. 8. An exterior view of the water tunnel 40 is provided in FIG. 3.) The sluice 34 (See FIG. 11) is to convey the water from the water tunnel 40 to a sump 36 defined in the bottom portion 20. A sump drain port 42 (See FIG. 3.) is defined in the air inlet housing bottom portion 20 in fluid communication with the sump 36 (See FIGS. 10 and 11) to drain the water from the sump 36.

In some examples of the present disclosure, the air inlet housing 14 may be disposed in a passenger compartment of the vehicle (not shown). The air inlet housing 14 may be connected to an intake side 15 of the blower 16. The air inlet housing 14 has inlet housing walls 19 defined by the top portion 18 and the bottom portion 20. (See, e.g., FIG. 4.)

In some examples, the HVAC air inlet housing 14 further includes a baffle door 17 (see, e.g., FIG. 5) disposed in the air inlet housing 14. The baffle door 17 may be rotatable about an axle 46. The axle 46 is disposed at a central edge 48 of the baffle door 17. The baffle door 17 defines a distal edge 49 distal to the central edge 48. As depicted in FIG. 3, the air inlet housing 14 defines an inlet frame 50 to abut at least the distal edge 49 of the baffle door 17 when the baffle door 17 is in a closed position. The baffle door 17 is rotatable between an open position and the closed position to open and close the air inlet 24 and to throttle a flow of air passing through the air inlet 24.

It is to be understood that the baffle door 17 may be any suitable baffle door 17. For example, the axle 46 may be a single rod, like a hinge pin; or the axle 46 may have separate upper and lower pins. The axle 46 may be a single part with the baffle door 17 (i.e., molded into the baffle door 17), or the baffle door 17 may have separable parts (e.g., axle 46 pressed into baffle door 17). The baffle door 17 may be flat, as depicted in FIG. 5, or curved. The baffle door 17 may have a resilient seal (not shown) disposed at a perimeter of the baffle door 17.

As used herein, "fresh air" means air that is drawn into the HVAC system 10 or air inlet housing 14 from outside of the passenger compartment of the vehicle. It is to be understood that "fresh air" may include constituents found in an atmosphere surrounding the vehicle, and is therefore not necessarily clean air. Fresh air is distinguished from recirculated air that is drawn into the HVAC system or air inlet housing 14 from the passenger compartment. A replaceable cabin air filter (not shown) may be installable in the air inlet housing 14 through an air filter slot 45 defined in the air inlet housing bottom portion 20.

As used herein, the baffle door closed position means that the baffle door 17 is in a position relative to the air inlet housing 14 to substantially block fresh air from flowing into the fresh air duct 26. Substantially block fresh air means the flow (cubic feet per minute) of fresh air without the baffle door 17 is reduced by at least 90 percent. In an example, the baffle door 17 may be sealed against the inlet frame 50. As used herein, the baffle door open position means that the baffle door 17 is in a position relative to the air inlet housing to maximize the flow of fresh air into the fresh air duct 26. As such, when the baffle door 17 is in the open position, the baffle door 17 is in a position that is least restrictive to a flow of fresh air into the fresh air duct 26.

In some examples of the present disclosure, the air inlet housing 14 further includes a cap 27 disposed on the air inlet housing bottom portion 20 to cover the sluice 34 and the sump 36. The cap 27 is to define a part of a door sweep portion 22. The door sweep portion 22 is adjacent to a space swept by the baffle door 17 as the baffle door 17 rotates from the open position to the closed position. The space swept by the baffle door 17 as the baffle door 17 rotates from the open position to the closed position is a cylindrical sector. The door sweep portion 22 is defined on the walls of the bottom portion 20 and/or the cap 27. The cap 27 is to form a water barrier 39 over the sluice 34. A basin 41 is defined in the cap 27 to collect water and direct the water to a drain hole 43. The basin 41 collects water from any source that may be in the bottom portion 20 of the air inlet housing 14 above the cap 27. It is to be understood, however, that cap 27 is to cover the sluice 34 and the sump 36, thereby keeping the water that drains through the water tunnel 40 into the sluice 34 and into the sump 36 below the cap 27. The drain hole 43 is defined in the basin 41 to allow the water to drain from the basin 41 into the sump 36. As used herein, "to allow the water to drain" means any liquid water present will flow under the influence of gravity from a higher level to a lower level. A path for the water in an open channel (e.g. a sluice) or a closed channel (e.g. a pipe, tube, or tunnel) from the higher level to the lower level is open.

In examples of the present disclosure, the water tunnel 40 includes a water channel 32 defined by the bottom portion 20 of the air inlet housing 14. A water channel cover 38 is defined by the top portion 18 of the air inlet housing 14. The water channel 32 and the water channel cover 38 together form the water tunnel 40. The sluice 34 drains into the sump 36 defined in the bottom portion 20 of the air inlet housing 14.

Figure 13:
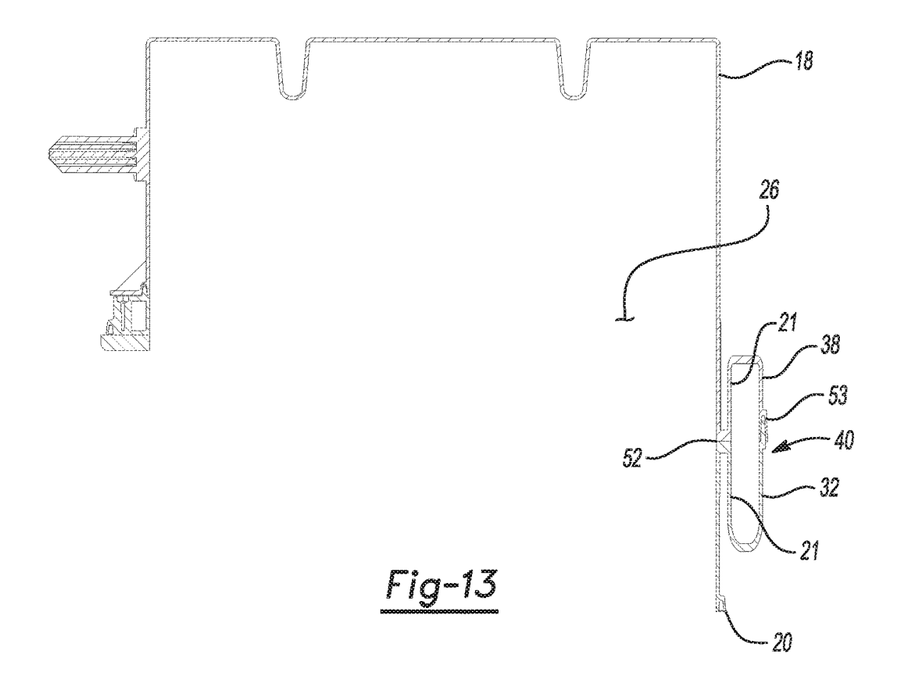
FIG. 13 is a cross-sectional view through the air inlet housing as depicted in FIG. 6.

In some example of the present disclosure, the water channel cover 38 is to sealingly enclose the water channel 32, thereby forming the water tunnel 40. The water tunnel 40 may have tunnel walls 21 forming a watertight barrier between the water tunnel 40 and the fresh air duct 26. In examples of the present disclosure, the water tunnel 40 prevents the water from mixing with, or evaporating into the fresh air in the fresh air duct 26. As depicted in the cross-section of the example shown in FIG. 13, the joint between the water channel cover 38 and the water channel 32 may include a butt joint 52, a tongue-and groove joint 53, a lap joint, or any suitable joint or combination of joints. The water channel cover 38 may be welded to the water channel 32, or attached with adhesives, or removably attached with fasteners. In examples, a gasket (not shown) or sealant (not shown) may be included to promote forming watertight tunnel walls 21. In other examples, the watertight tunnel walls may be formed without a gasket or sealant.

An HVAC system 10 for a vehicle is also disclosed herein. As depicted in FIG. 1, examples of the HVAC system 10 of the present disclosure include an evaporator housing 12 having an evaporator drain port 13 and an air inlet housing 14 having a top portion 18 and a bottom portion 20. A fresh air duct 26 is defined by the air inlet housing 14. The fresh air duct 26 is to convey fresh air from an air inlet 24 to a blower 16. A water inlet port 28 is defined in the bottom portion 20. A hose 30 is to connect the evaporator drain port 13 to the water inlet port 28 and to convey water therebetween. A water tunnel 40 is defined by the air inlet housing 14 to convey the water from the water inlet port 28 to a sluice 34 defined in the bottom portion 20. The sluice 34 is to convey the water from the water tunnel 40 to a sump 36 defined in the bottom portion 20. A sump drain port 42 is defined in the air inlet housing bottom portion 20 in fluid communication with the sump 36 to drain the water from the sump 36.

In some examples of the HVAC system 10 disclosed herein, the evaporator housing 12 is to collect the water from condensation and channel the water to the evaporator drain port 13.

In examples of the present disclosure, the air inlet housing 14 is disposed in a passenger compartment of the vehicle.

The air inlet housing 14 is connected to an intake side 15 of the blower 16. The air inlet housing has inlet housing walls 19 defined by the top portion 18 and the bottom portion 20.

In examples of the present disclosure, the HVAC system 10 may further include a baffle door 17 disposed in the air inlet housing 14. The baffle door 17 is rotatable about an axle 46. The axle 46 is disposed at a central edge 48 of the baffle door 17. The baffle door 17 defines a distal edge 49 distal to the central edge 48. The air inlet housing 14 defines an inlet frame 50 to abut at least the distal edge 49 of the baffle door 17 when the baffle door 17 is in a closed position. The baffle door 17 is rotatable between an open position and the closed position to open and close the air inlet 24 and to throttle a flow of air passing through the air inlet 24.

In examples of the present disclosure, the HVAC system 10 may further include a cap 27 disposed on the air inlet housing bottom portion 20 to cover the sluice 34 and the sump 36. The cap 27 is to define a part of a door sweep portion 22. The door sweep portion 22 is adjacent to a space 37 swept by the baffle door 17 as the baffle door 17 rotates from the open position to the closed position. The cap 27 is to form a water barrier 39 over the sluice 34. A basin 41 is defined in the cap 27 to collect water and direct the water to a drain hole 43. The drain hole 43 is defined in the basin 41 to allow the water to drain from the basin 41 into the sump 36.

In examples of the HVAC system 10 disclosed herein, the water tunnel 40 may include a water channel 32 defined by the bottom portion 20 of the air inlet housing 14. A water channel cover 38 may be defined by the top portion 18 of the air inlet housing 14. As disclosed herein, the water channel 32 and the water channel cover 38 together may form the water tunnel 40. The sluice 34 may drain into the sump 36 defined in the bottom portion 20 of the air inlet housing 14.

In examples of the HVAC system 10 disclosed herein, the water channel cover 38 may be to sealingly enclose the water channel 32, thereby forming the water tunnel 40. The water tunnel 40 may have tunnel walls 21 forming a watertight barrier between the water tunnel 40 and the fresh air duct 26. In examples of the HVAC system 10 disclosed herein, the water tunnel 40 may prevent water from mixing with, or evaporating into the fresh air in the fresh air duct 26.

Figure 14:
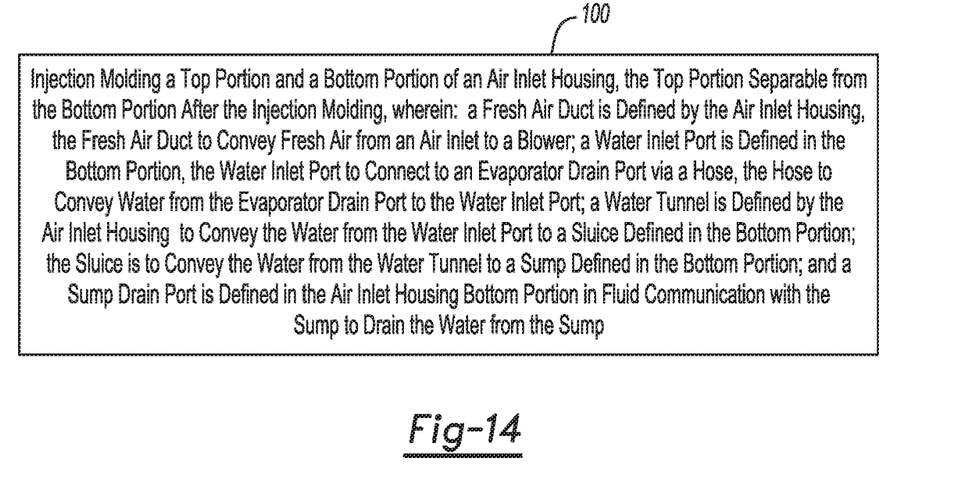
FIG. 14 is a block diagram depicting a method for making an HVAC air inlet housing for a vehicle according to the present disclosure.

A method 100 of making an HVAC air inlet housing 14 for a vehicle is disclosed herein. As depicted in FIG. 14, the method 100 includes injection molding a top portion 18 and a bottom portion 20 of an air inlet housing. The top portion 18 is separable from the bottom portion 20 after the injection molding. A fresh air duct 26 is defined by the air inlet housing 14. The fresh air duct 26 is to convey fresh air from an air inlet 24 to a blower 16. A water inlet port 28 is defined in the bottom portion 20. The water inlet port 28 is to connect to an evaporator drain port 13 via a hose 30. The hose 30 is to convey water from the evaporator drain port 13 to the water inlet port 28. A water tunnel 40 is defined by the air inlet housing 14 to convey the water from the water inlet port 28 to a sluice 34 defined in the bottom portion 20. The sluice 34 is to convey the water from the water tunnel 40 to a sump 36 defined in the bottom portion. A sump drain port 42 is defined in the air inlet housing bottom portion 20 in fluid communication with the sump 36 to drain the water from the sump 36.

In some examples of the method 100, the air inlet housing 14 may be disposed in a passenger compartment of the vehicle. The air inlet housing 14 may be connected to an intake side 15 of the blower 16. The air inlet housing 14 may have inlet housing walls 19 defined by the top portion 18 and the bottom portion 20.

Examples of the method 100 may further include disposing a baffle door 17 in the air inlet housing 14. The baffle door 17 may be rotatable about an axle 46. The axle 46 may be disposed at a central edge 48 of the baffle door 17. The baffle door 17 may define a distal edge 49 distal to the central edge 48. The air inlet housing 14 may define an inlet frame 50 to abut at least the distal edge 49 of the baffle door 17 when the baffle door 17 is in a closed position. The baffle door 17 may be rotatable between an open position and the closed position to open and close the air inlet 24 and to throttle a flow of air passing through the air inlet 24.

Examples of the method 100 may further include forming a cap 27 from a plastic material; forming a basin 41 defined in the cap 27 to collect water and to direct the water to a drain hole 43; forming the drain hole 43 in the basin 41 to allow the water to drain from the basin 41 into the sump 36; and disposing the cap 27 on the air inlet housing bottom portion 20 to cover the sluice 34 and the sump 36. The cap 27 may be to define a part of a door sweep portion 22. The door sweep portion 22 is adjacent to a space 37 swept by the baffle door 17 as the baffle door 17 rotates from the open position to the closed position. The cap 27 may be to form a water barrier 39 over the sluice 34. The sluice 34 may drain into the sump 36 defined in the bottom portion 20 of the air inlet housing 14.

Examples of the method 100 may further include forming the water tunnel 40 by connecting the top portion 18 to the bottom portion 20 such that a water channel cover 38 defined by the top portion 18 of the air inlet housing 14 sealingly encloses a water channel 32 defined by the bottom portion 20 of the air inlet housing 14. The water channel 32 and the water channel cover 38 together form the water tunnel 40. The water tunnel 40 has tunnel walls 21 forming a watertight barrier between the water tunnel 40 and the fresh air duct 26. The water tunnel 40 prevents water from mixing with, or evaporating into the fresh air in the fresh air duct 26.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

The terms "connect/connected/connection", "attach/attached/attachment" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" or "attached to" the other component is somehow in communication with the other component (notwithstanding the presence of one or more additional components therebetween). Additionally, two components may be permanently, semi-permanently, or releasably engaged with and/or connected to one another.

It is to be further understood that "communication" is to be construed to include all forms of communication, including direct and indirect communication. Indirect communication may include communication between two components with additional component(s) located therebetween.

While several examples have been described in detail, it is to be understood that the disclosed examples may be modified. Therefore, the foregoing description is to be considered non-limiting.

What is claimed is:

1. An HVAC air inlet housing for a vehicle, comprising:
a top portion and a bottom portion;
a fresh air duct defined by the air inlet housing, the fresh air duct to convey fresh air from an air inlet to a blower;
a water inlet port defined in the bottom portion, the water inlet port to connect to an evaporator drain port via a hose, the hose to convey the water from the evaporator drain port to the water inlet port;
a water tunnel defined by the air inlet housing to convey the water from the water inlet port to a sluice defined in the bottom portion, wherein:
the water tunnel includes:
a water channel defined by the bottom portion of the air inlet housing; and
a water channel cover defined by the top portion of the air inlet housing;
the water channel and the water channel cover together form the water tunnel;
the sluice drains into the sump defined in the bottom portion of the air inlet housing;
the water channel cover is to sealingly enclose the water channel, thereby forming the water tunnel; and
the water tunnel has tunnel walls forming a watertight barrier between the water tunnel and the fresh air duct;
the sluice to convey the water from the water tunnel to a sump defined in the bottom portion; and
a sump drain port defined in the air inlet housing bottom portion in fluid communication with the sump to drain the water from the sump.

2. The HVAC air inlet housing as defined in claim 1 wherein:
the air inlet housing is disposed in a passenger compartment of the vehicle;
the air inlet housing is connected to an intake side of the blower; and
the air inlet housing has inlet housing walls defined by the top portion and the bottom portion;

3. The HVAC air inlet housing as defined in claim 2, further including a baffle door disposed in the air inlet housing, wherein:
the baffle door is rotatable about an axle;
the axle is disposed at a central edge of the baffle door;
the baffle door defines a distal edge distal to the central edge;
the air inlet housing defines an inlet frame to abut at least the distal edge of the baffle door when the baffle door is in a closed position; and
the baffle door is rotatable between an open position and the closed position to open and close the air inlet and to throttle a flow of air passing through the air inlet.

4. The HVAC air inlet housing as defined in claim 1 wherein the water tunnel prevents the water from mixing with, or evaporating into the fresh air in the fresh air duct.

5. An HVAC air inlet housing for a vehicle, comprising:
a top portion and a bottom portion;
a fresh air duct defined by the air inlet housing, the fresh air duct to convey fresh air from an air inlet to a blower;
a water inlet port defined in the bottom portion, the water inlet port to connect to an evaporator drain port via a hose, the hose to convey the water from the evaporator drain port to the water inlet port;
a water tunnel defined by the air inlet housing to convey the water from the water inlet port to a sluice defined in the bottom portion;
the sluice to convey the water from the water tunnel to a sump defined in the bottom portion;
a sump drain port defined in the air inlet housing bottom portion in fluid communication with the sump to drain the water from the sump;
wherein:
the air inlet housing is disposed in a passenger compartment of the vehicle;
the air inlet housing is connected to an intake side of the blower; and
the air inlet housing has inlet housing walls defined by the top portion and the bottom portion;
a baffle door disposed in the air inlet housing, wherein:
the baffle door is rotatable about an axle;
the axle is disposed at a central edge of the baffle door;
the baffle door defines a distal edge distal to the central edge;
the air inlet housing defines an inlet frame to abut at least the distal edge of the baffle door when the baffle door is in a closed position; and
the baffle door is rotatable between an open position and the closed position to open and close the air inlet and to throttle a flow of air passing through the air inlet;
a cap disposed on the air inlet housing bottom portion to cover the sluice and the sump, the cap to define a part of a door sweep portion, the door sweep portion adjacent to a space swept by the baffle door as the baffle door rotates from the open position to the closed position, the cap to form a water barrier over the sluice;
a basin defined in the cap to collect water and direct the water to a drain hole; and
the drain hole defined in the basin to allow the water to drain from the basin into the sump.

6. The HVAC air inlet housing as defined in claim 5 wherein:
the water tunnel includes:
a water channel defined by the bottom portion of the air inlet housing; and
a water channel cover defined by the top portion of the air inlet housing;
the water channel and the water channel cover together form the water tunnel; and
the sluice drains into the sump defined in the bottom portion of the air inlet housing.

7. The HVAC air inlet housing as defined in claim 6 wherein:
the water channel cover is to sealingly enclose the water channel, thereby forming the water tunnel; and
the water has tunnel walls forming a watertight barrier between the water tunnel and the tunnel fresh air duct.

8. The HVAC air inlet housing as defined in claim 5 wherein the water tunnel prevents the water from mixing with, or evaporating into the fresh air in the fresh air duct.

9. An HVAC system for a vehicle, comprising:
an evaporator housing having an evaporator drain port;
an air inlet housing having a top portion and a bottom portion;
a fresh air duct defined by the air inlet housing, the fresh air duct to convey fresh air from an air inlet to a blower;
a water inlet port defined in the bottom portion;

a hose to connect the evaporator drain port to the water inlet port and to convey water therebetween;
a water tunnel defined by the air inlet housing to convey the water from the water inlet port to a sluice defined in the bottom portion, wherein:
the water tunnel includes:
a water channel defined by the bottom portion of the air inlet housing; and
a water channel cover defined by the top portion of the air inlet housing;
the water channel and the water channel cover together form the water tunnel;
the sluice drains into the sump defined in the bottom portion of the air inlet housing;
the water channel cover is to sealingly enclose the water channel, thereby forming the water tunnel; and
the water tunnel has tunnel walls forming a watertight barrier between the water tunnel and the fresh air duct;
the sluice to convey the water from the water tunnel to a sump defined in the bottom portion; and
a sump drain port defined in the air inlet housing bottom portion in fluid communication with the sump to drain the water from the sump.

10. The HVAC system as defined in claim 9, wherein the evaporator housing is to collect the water from condensation and channel the water to the evaporator drain port.

11. The HVAC system as defined in claim 9 wherein:
the air inlet housing is disposed in a passenger compartment of the vehicle;
the air inlet housing is connected to an intake side of the blower; and
the air inlet housing has inlet housing walls defined by the top portion and the bottom portion.

12. The HVAC system as defined in claim 9, further including a baffle door disposed in the air inlet housing, wherein:
the baffle door is rotatable about an axle;
the axle is disposed at a central edge of the baffle door;
the baffle door defines a distal edge distal to the central edge;
the air inlet housing defines an inlet frame to abut at least the distal edge of the baffle door when the baffle door is in a closed position; and
the baffle door is rotatable between an open position and the closed position to open and close the air inlet and throttle a flow of air passing through the air inlet.

13. The HVAC system as defined in claim 9 wherein the water tunnel prevents the water from mixing with, or evaporating into the fresh air in the fresh air duct.

14. An HVAC system for a vehicle, comprising:
an evaporator housing having an evaporator drain port;
an air inlet housing having a top portion and a bottom portion;
a fresh air duct defined by the air inlet housing, the fresh air duct to convey fresh air from an air inlet to a blower;
a water inlet port defined in the bottom portion;
a hose to connect the evaporator drain port to the water inlet port and to convey water therebetween;
a water tunnel defined by the air inlet housing to convey the water from the water inlet port to a sluice defined in the bottom portion;
the sluice to convey the water from the water tunnel to a sump defined in the bottom portion; and
a sump drain port defined in the air inlet housing bottom portion in fluid communication with the sump to drain the water from the sump;
a baffle door disposed in the air inlet housing, wherein:
the baffle door is rotatable about an axle;
the axle is disposed at a central edge of the baffle door;
the baffle door defines a distal edge distal to the central edge;
the air inlet housing defines an inlet frame to abut at least the distal edge of the baffle door when the baffle door is in a closed position; and
the baffle door is rotatable between an open position and the closed position to open and close the air inlet and throttle a flow of air passing through the air inlet;
a cap disposed on the air inlet housing bottom portion to cover the sluice and the sump, the cap to define a part of a door sweep portion, the door sweep portion adjacent to a space swept by the baffle door as the baffle door rotates from the open position to the closed position, the cap to form a water barrier over the sluice;
a basin defined in the cap to collect water and direct the water to a drain hole; and
the drain hole defined in the basin to allow the water to drain from the basin into the sump.

15. The HVAC system as defined in claim 14, wherein the evaporator housing is to collect the water from condensation and channel the water to the evaporator drain port.

16. The HVAC system as defined in claim 14 wherein:
the air inlet housing is disposed in a passenger compartment of the vehicle;
the air inlet housing is connected to an intake side of the blower; and
the air inlet housing has inlet housing walls defined by the top portion and the bottom portion.

17. A method of making an HVAC air inlet housing for a vehicle, comprising:
injection molding a top portion and a bottom portion of an air inlet housing, the top portion separable from the bottom portion after the injection molding, wherein:
a fresh air duct is defined by the air inlet housing, the fresh air duct to convey fresh air from an air inlet to a blower;
a water inlet port is defined in the bottom portion, the water inlet port to connect to an evaporator drain port via a hose, the hose to convey water from the evaporator drain port to the water inlet port;
a water tunnel is defined by the air inlet housing to convey the water from the water inlet port to a sluice defined in the bottom portion;
the sluice is to convey the water from the water tunnel to a sump defined in the bottom portion; and
a sump drain port is defined in the air inlet housing bottom portion in fluid communication with the sump to drain the water from the sump;
forming the water tunnel by connecting the top portion to the bottom portion such that a water channel cover defined by the top portion of the air inlet housing sealingly encloses a water channel defined by the bottom portion of the air inlet housing, wherein:
the water channel and the water channel cover together form the water tunnel;
the water tunnel has tunnel walls forming a watertight barrier between the water tunnel and the fresh air duct; and
the water tunnel prevents water from mixing with, or evaporating into the fresh air in the fresh air duct.

18. The method as defined in claim 17 wherein:
the air inlet housing is disposed in a passenger compartment of the vehicle;
the air inlet housing is connected to an intake side of the blower; and
the air inlet housing has inlet housing walls defined by the top portion and the bottom portion.

19. The method as defined in claim 18, further including disposing a baffle door in the air inlet housing, wherein:
the baffle door is rotatable about an axle;
the axle is disposed at a central edge of the baffle door;
the baffle door defines a distal edge distal to the central edge;
the air inlet housing defines an inlet frame to abut at least the distal edge of the baffle door when the baffle door is in a closed position; and
the baffle door is rotatable between an open position and the closed position to open and close the air inlet and to throttle a flow of air passing through the air inlet.

20. A method of making an HVAC air inlet housing for a vehicle, comprising:
injection molding a top portion and a bottom portion of an air inlet housing, the top portion separable from the bottom portion after the injection molding, wherein:
a fresh air duct is defined by the air inlet housing, the fresh air duct to convey fresh air from an air inlet to a blower;
a water inlet port is defined in the bottom portion, the water inlet port to connect to an evaporator drain port via a hose, the hose to convey water from the evaporator drain port to the water inlet port;
a water tunnel is defined by the air inlet housing to convey the water from the water inlet port to a sluice defined in the bottom portion;
the sluice is to convey the water from the water tunnel to a sump defined in the bottom portion;
a sump drain port is defined in the air inlet housing bottom portion in fluid communication with the sump to drain the water from the sump;
the air inlet housing is disposed in a passenger compartment of the vehicle;
the air inlet housing is connected to an intake side of the blower; and
the air inlet housing has inlet housing walls defined by the top portion and the bottom portion;
disposing a baffle door in the air inlet housing, wherein:
the baffle door is rotatable about an axle;
the axle is disposed at a central edge of the baffle door;
the baffle door defines a distal edge distal to the central edge;
the air inlet housing defines an inlet frame to abut at least the distal edge of the baffle door when the baffle door is in a closed position; and
the baffle door is rotatable between an open position and the closed position to open and close the air inlet and to throttle a flow of air passing through the air inlet;
forming a cap from a plastic material;
forming a basin defined in the cap to collect water and to direct the water to a drain hole;
forming the drain hole in the basin to allow the water to drain from the basin into the sump; and
disposing the cap on the air inlet housing bottom portion to cover the sluice and the sump, wherein:
the cap is to define a part of a door sweep portion;
the door sweep portion is adjacent to a space swept by the baffle door as the baffle door rotates from the open position to the closed position;
the cap is to form a water barrier over the sluice; and
the sluice drains into the sump defined in the bottom portion of the air inlet housing.

\* \* \* \* \*